United States Patent Office 3,527,712
Patented Sept. 8, 1970

3,527,712
DRIED AGAROSE GEL, METHOD OF PREPARATION THEREOF, AND PRODUCTION OF AQUEOUS AGAROSE GEL
Donald W. Renn, Glen Cove, and George P. Mueller, Camden, Maine, assignors to Marine Colloids, Inc., Springfield, N.J., a corporation of Delaware
No Drawing. Filed Mar. 7, 1967, Ser. No. 621,119
Int. Cl. B01d 15/08; B01j 13/00; C08b 25/00
U.S. Cl. 252—316                                    16 Claims

ABSTRACT OF THE DISCLOSURE

An agarose gel produced at a concentration of about 0.5% to about 5% by weight and suitable for such purposes as chromatography and other selective molecular transmission or diffusion is produced in dry form with a macro-molecular predominantly organic hydrocolloid contained in and preserving the gel structure, thereby improving the capacity of the dried gel upon rehydration to substantially reassume its original cell structure for uses of the character aforesaid after removal of the hydrocolloid by leaching from the rehydrated gel.

FIELD OF THE INVENTION

This invention relates to molecular sieve chromatography and related uses of porous systems for selective molecular transmission or diffusional or electrophoretic migration. For purposes of brevity, such uses are referred to generally herein as gel filtration. It relates more especially to the preparation in dry form of a gel structure capable of rehydration to provide a porous medium having improved or predetermined utility for purposes such as those just mentioned.

DESCRIPTION OF THE PRIOR ART

The capacity of certain porous media to accomplish molecular sorting is well known. The molecules which are susceptible to selective sorting are dependent upon the porous structure of the porous material that is employed for gel filtration. That which characterizes a particular porous substance as regards its utility for gel filtration is the capacity to distinguish between molecules of different sizes specifically in a liquid system when a solution containing molecules of different sizes is passed through a bed made up of particulate porous material suitable for molecular sieving chromatography, those molecules having dimensions larger than the pores in the porous medium will be restricted from entering the pores and will move only in the external solvent phase. On the other hand, molecules smaller than the pore size will enter the medium and thus will move both internally and externally so as to result in retardation in relation to the larger molecules and, therefore, later elution from the medium. Accordingly, the effectiveness for accomplishing separation or sorting in the case of liquids containing molecules of different sizes, depending on the type of separation to be accomplished, is dependent on the ability to provide a porous medium having a pore size appropriate for accomplishing the desired separation.

Materials that heretofore have been regarded as exhibiting useful gel filtration properties include crosslinked dextrans, polyacrylamide gels, porous glass and agar and agarose gels. Experience has brought out that the crosslinked dextrans and the polyacrylamide gels are limited as regards their usage by the fact that molecules having a molecular weight greater than about 200,000 are excluded. Thus, while separation of smaller molecules can be achieved, it is not possible to effect separation or sorting as between molecules having molecular weight greater than about 200,000. Porous glass has been used to cover the entire range of molecular size but its availability is limited, and it suffers from inherent non-specific adsorption in a number of applications.

Agarose has the property of forming gels having utility for gel filtration. Agarose is soluble in water at a temperature near the boiling point of water for the formation of solutions of predetermined concentration. Upon cooling, the agarose provides a gel which is high in mechanical strength even at low concentrations and which is of ordered porosity, the pore size depending upon the concentration of the agarose. It also is the case that agarose exhibits little if any non-specific adsorption of molecules. These properties of agarose gels make them useful as gel filtration media. For agarose concentrations greater than 5% the porosity of the gel is roughly comparable to that provided by the cross-linked dextrans and by the polyacrylamide gels in that while separation of smaller molecules can be achieved, it is not possible to effect separation between molecules in the area of molecular weights greater than 200,000. However, agarose is notable for the fact that gels having sufficient strength for gel filtration uses are afforded when the concentration of the agarose is less than 5% and even is as little as 0.5%. As the concentration of the agarose is thus decreased so as to be less than 5%, the effective pore size of the gel is increased and, depending on the particular concentration of agarose that is selected, it becomes possible to effect molecular sorting as between molecules of different sizes in the order of molecular weights greater than 200,000.

For gel filtration purposes, an agarose gel may be used in its condition as initially formed, namely, as a gel wherein the agarose content is that of the solution used in its preparation. The suitability of pore structure at given concentrations is something which is the subject of experimental determination such that when the gel for a particular purpose is desired that concentration is selected which experience has shown to be appropriate for that purpose. However, because of the low concentration of the agarose in the gel it is commercially inconvenient to supply the gel in the wet state. It is commercially desirable, therefore, to provide an agarose gel in the dry state which is capable of rehydration to provide an aqueous gel having desired predetermined porous characteristics. In the case of agarose gels containing over 5% of agarose the gel may be successfully dried to provide a product which, when rehydrated, will have substantially the same pore structure characteristics for gel filtration purposes as the freshly prepared gel. For effecting the drying, the preferred procedure is to break up the gel into a multiplicity of small pieces and then remove the water by treatment with a hydrophilic liquid, the hydrophilic liquid thereafter being removed by drying. Agarose gels containing less than 5% agarose which have the unique capability of sorting molecules falling within the range greater than 200,000 do not lend themselves to being reduced to the dried state due to the fact that upon rehydration the gels do not become restored to the desired porosity of the initially formed gel to a sufficient extent to be of practical utility for effecting the desired molecular separation to be effected.

SUMMARY OF THE INVENTION

It is an object of this invention to provide a method whereby an aqueous agarose gel at concentrations of about 0.05% to 5% may be dried to provide a dry product that is capable of rehydration to form an aqueous gel wherein the porous structure of the gel is preserved and preferably wherein the concentration of the agarose in the rehydrated gel is substantially the same as or so close to that of the initially formed gel as to possess corresponding utility for gel filtration. It is a further object of this invention to provide a dried gel of the character aforesaid adapted for commercial production and sale.

The aforesaid objectives have been realized, according to this invention, by introducing into the porous structure of an agarose gel containing from about 0.5% to 5% by weight of agarose a dissolved macro-molecular hydrocolloid that is soluble in water at a temperature below that at which agarose has finite solubility and then effecting the drying so that the hydrocolloid becomes reduced to solid state within the porous structure of the agarose gel.

For molecular sieve chromatography the drying of the agarose gel should be initiated while the solid gel contains the macro-molecular hydrocolloid in a dissolved state within the pores thereof and it is accomplished by removing the water from the gel particles by contact with a volatile water soluble hydrophilic liquid such as acetone. By drying in this way the dissolved hydrocolloid becomes coagulated in situ within the pores of the agarose and preserves the effective pore structure of the agarose gel and improves the capacity of the dried agarose gel to retain its capacity to rehydrate to the solids content of the gel in its freshly prepared state.

Since the macro-molecular hydrocolloid is water soluble at a temperature below that at which agarose possesses finite solubility, it follows that upon rehydration of the dried gel the agarose remains insoluble while the added hydrocolloid becomes dissolved and can be removed by leaching, leaving the agarose gel. The agarose remains insoluble in water unless heated to a temperature of about 85° C. or higher. Accordingly, the macro-molecular hydrocolloid should be one which is soluble in water to form at least a 1% solution at a temperature of about 74° C. or lower. After the hydrocolloid has been removed by leaching, the percent by weight of the agarose in the rehydrated gel preferably is within about 20% of the percent by weight of the agarose in the gel as initially formed.

It has been found that when the agarose gel that has been dried under the conditions aforesaid and the ordered porosity of the agarose gel is preserved so that upon rehydration the percent by weight of the agarose is within 20% of the percent by weight of the original agarose gel, the ordered pore structure of the originally formed gel is retained to an extent such that the rehydrated gel may be employed for accomplishing molecular separations substantially similar to those for which the initially formed gel was suitable. When it is present during the drying and rehydration steps the occluded macromolecular hydrocolloid serves as a macro-molecular surrogate that substitutes for, or stands in the place of, the macromolecule which later enters the gel during gel filtration and thereby acts to preserve in the rehydrated gel, after removal of the hydrocolloid by leaching, selectivity of entry of macromolecules corresponding to that possessed by an agarose gel containing a like percentage of agarose freshly produced but in the absence of any occluded hydrocolloid. Accordingly, one is enabled to supply a dried agarose gel which when rehydrated will have a predetermined utility for accomplishing a given type of molecular separation. As aforesaid, in so far as is known, this had not heretofore been accomplished so as to permit molecullar separation as between molecules, all of which have a molecular weight greater than about 200,000 as is the case, for example, with substances such as polysaccharides, deoxyribonucleic acid and macro globulins.

The hydrocolloid, which serves as a surrogate during the drying and subsequent rehydration of the agarose gel, is macro-molecular and has a molecular weight of from about 5000 to about $1 \times 10^6$ or greater, there being no upper limit so long as the hydrocolloid possesses the requisite water solubility. Preferably the macro-molecular hydrocolloid will have a molecular weight of about 100,000 to about 1,000,000. The macro-molecular hydrocolloid should, of course, be one which may become coagulated within the pore structure of the agarose and dissolved out again without appreciable reaction with the agarose, but this property is generally inherent due to the inertness of agarose.

The macro-molecular hydrocolloid, since its function is essentially a physical one as a structural surrogate during drying, may vary widely as regards chemical constituency and sources. Thus, the macro-molecular hydrocolloid may be one obtained from a sea plant or other algal hydrocolloid, as well as salts, modifications and derivatives of the naturally occurring hydrocolloid such as sodium alginate or other soluble salt of algin, potassium lambda carrageenate, ordinary carrageenan obtained from a sea plant such as *Chondrus crispus* (Irish moss) and the like. The hydrocolloid may also be a hydrocolloid that is obtained from land plants as well as salts, modifications and derivatives thereof, e.g., gum tragacanth, okra mucilage, hydroxyethyl cellulose, sodium carboxymethyl cellulose, guar gum, pectinic acid amide and carboxymethyl locust bean gum. In addition to hydrocolloids of vegetable origin, hydrocolloids of animal origin, their salts, modifications and derivatives may be employed, e.g., deacetylated chitin. The hydrocolloid also may be synthetic, such as polyethylene oxide and polyvinylpyrollidone. The hydrocolloid also may be in the nature of a micro-organism hydrocolloid (bacterial, fungal, etc.) as well as salts, modifications and derivatives thereof, e.g., phosphomannan Y2448, polysaccharide B1973, and polysaccharide Y1401.

As exemplified above, the macro-molecular hydrocolloid may be entirely organic or may be chiefly or predominantly organic, e.g., as in the case of salts and in the case of hydrocolloids such as carrageenan that contain sulfate groups.

Since the macro-molecular hydrocolloid is employed initially in aqueous solution or dispersion, it is used at low concentrations because at concentrations above about 1% the solution becomes undesirably viscous. Accordingly, the hydrocolloid is caused to be present at concentrations of about 0.1% to about 1.0% based on the total weight of the aqueous composition containing the agarose. Preferably it is employed at a concentration of approximately 0.5%.

The macro-molecular hydrocolloid may be brought into the agarose gel structure in either of two ways. According to one way, the hydrocolloid is caused to be included in the solution of agarose that is produced at elevated temperature so that when the agarose gel is formed upon cooling the solution of the macro-molecular hydrocolloid will become included in the porous agarose gel structure as it is formed. Alternatively, the agarose gel may be formed initially in the absence of the macro-molecular hydrocolloid. In such case the resulting gel may be broken up into finely-divided particles that, before being dried, are soaked in a solution of the macro-molecular hydrocolloid, the excess solution being separated from the soaked particles prior to drying.

In typical practice wherein the macro-molecular hydrocolloid is included in the agarose solution prior to gelling the agarose the desired concentration of agarose is added to an aqueous solution of the selected macro-molecular hydrocolloid, the dissolution of the agarose being effected by heating to a temperature between about 90° C. and 100° C. while maintaining agitation. Upon cooling to a temperature below about 36° C. a gel is formed which, as aforesaid in the practice of this invention, may contain from about 0.5 to about 5.0% of agarose depending on the contemplated size of the molecules as to which filtration or sorting is to be effected, the size molecules with which the gel is effective varying inversely with the concentration of the agarose in percent by weight of the aqueous gel.

After the gel has been formed with the macro-molecular hydrocolloid contained in the porous structure of the gel, the gel is prepared for drying it by subdividing it into finely-divided particles. The size of the particles is not critical for the process herein described except that as the size of the particles decreases effective contact with the drying liquid becomes promoted. The particle size of the gel conveniently may be such as to pass a standard testing screen between 60 mesh and 150 mesh. The subdivision of the gel may be accomplished in any suitable way. It has been found convenient to extrude the aqueous gel through a screen, or through a succession of screens that have successively smaller openings.

After the gel has been subdivided the gel particles are dehydrated by commingling the particles with volatile hydrophilic dehydrating liquid, the drying being hastened by successively mixing the particles with quantities of hydrophilic liquid, the spent hydrophilic liquid being largely removed before the next quantity of hydrophilic liquid is added. Conveniently on each treatment with the hydrophilic liquid one part of the gel to be dehydrated is added to about three to about five parts by volume of the hydrophilic liquid.

When the gel is commingled with the hydrophilic liquid the effect is not only to remove the water from the gel but also to coagulate the macro-molecular hydrocolloid so that the macro-molecular hydrocolloid substantially in its entirety becomes entrapped in solid form within the porous structure of the agarose gel. Thus, whereas the agarose gel structure that is formed at concentrations as low as 0.5% to 5% is so weak as to become permanently damaged upon drying, the presence of the macro-molecular hydrocolloid serves as a surrogate that is effective to increase the resistance of the agarose gel to alteration of the port size or structure thereof during drying and subsequent rehydration of the agarose gel. The macro-molecular hydrocolloid should be substantially insoluble in the dehydrating hydrophilic liquid. Moreover, the macro-molecular hydrocolloid should be substantially inert with respect to the dehydrating liquid in the sense that after the drying has been effected the macro-molecular hydrocolloid will retain its solubility in water so that it may be leached from the rehydrated agarose gel at a temperature at which the agarose gel does not have finite solubility.

After the treatment with the dehydrating liquid the dried gel particles are separated from the residual dehydrating liquid as by filtration, centrifugation or decantation followed by air drying or other evaporation of residual hydrophilic liquid at a temperature not above 80° C. After drying, the dried gel particles may be milled to any desired size and, if desired, classified as to particle size, as by screening.

The procedure that is employed when a preformed agarose gel is soaked in a solution of the macro-molecular hydrocolloid is similar to the foregoing as regards the formation of the agarose gel. However, the gel is broken up into finely-divided pieces, e.g., so as to pass a standard screen of the order of about 60 mesh to about 150 mesh and the pieces of finely particulate gel are placed in the aqueous solution of the hydrocolloid so that the hydrocolloid molecules may diffuse into the porous structure of the gel. Soaking overnight is convenient, but soaking for as little as fifteen minutes, at least in one instance, has been found to be sufficient. The temperature is maintained below that at which the agarose has finite solubility. After soaking, the excess of the solution of the macro-molecular hydrocolloid is removed from the gel particles and the gel particles thereafter may be dehydrated and dried in the manner above described.

The agarose gel under consideration herein is that which contains the cell structure that is produced upon gelation to form an aqueous gel wherein the concentration of the agarose is between about 0.5% and about 5% by weight, the cell structure of the gel consisting essentially of agarose. However, it is to be understood that to the extent that agarose may be modified while essentially retaining the gel-forming and other physical properties of substantially pure agarose any such modification is to be regarded as agarose or as an agarose equivalent. The macro-molecular hydrocolloid merely serves as a temporary surrogate without chemical reaction with the agarose so that when the hydrocolloid is removed by leaching from the rehydrated dry gel that which remains is the cell structure consisting essentially of agarose. It is believed that the occluded macro-molecular hydrocolloid exercises a physical effect in minimizing loss of the cell structure of the original gel during the shrinkage that is incident to drying. However, it also may be the case that when the dried hydrocolloid becomes rehydrated along with the rehydration of the agarose, the swelling of the hydrocolloid prior to its removal by leaching assists in restoring the cells comprised in the cell structure to their size and shape prior to drying.

The hydrophilic liquid used in drying the agarose gel containing the occluded macro-molecular hydrocolloid serves essentially as a desiccant. The macro-molecular hydrocolloid is substantially insoluble in the hydrophilic liquid, and when the water is removed from the agarose there is concomitant commingling of the hydrophilic liquid with the water of the gel to form a mixture in which the hydrocolloid is so insoluble that it becomes coagulated. When the aqueous gel containing the dissolved hydrocolloid is commingled with the volatile hydrophilic liquid the concentration of the hydrophilic liquid in contact with the surfaces of the particles is such as to induce coagulation of the macro-molecular hydrocolloid at the surface of the particles and thereby minimize escape of the hydrocolloid. Moreover, the hydrocolloid is so insoluble in an hydrophilic liquid such as acetone, for example, that the hydrocolloid becomes coagulated in a blend of acetone and water containing only 10% to 20% of acetone. In any case, it has been found that when the drying of the gel is accomplished in the manner described the loss of the hydrocolloid from the gel structure is very slight.

The capacity of a hydrophilic liquid to serve as a desiccant or coagulant per se is known and is possessed by lower aliphatic alcohols such as methanol, ethanol, propanol and isopropanol, which also are desirable because of their volatility whereby after use they may be readily removed from the dried product by evaporation. The hydrophilic liquid which is preferred in the practice of this invention is a ketone such as acetone or methyl ethyl ketone. The effectiveness of a given macro-molecular hydrocolloid for use with an agarose gel of given concentration as regards the extent to which the dried agarose gel may be restored to its original agarose content by rehydration varies between different hydrophilic liquids and acetone has been found to possess best all-around effectiveness when used with different macro-molecular hydrocolloids in agarose gels containing different percentages of agarose. The superiority of acetone is especially pronounced when this invention is practiced by soaking a preformed aqueous agarose gel in a solution of the macro-molecular hydrocolloid. The effectiveness of a given macro-molecular hydrocolloid also is influenced by whether this invention is practiced by soaking a preformed aqueous agarose gel in a solution of a macro-molecular hydrocolloid or by including the macro-molecular hydrocolloid in the agarose gel as initially formed. A given macro-molecular hydrocolloid may exhibit greater effectiveness when used in one of these ways while another may exhibit greater effectiveness when employed in the other of these ways.

Instead of producing the agarose gel en masse and then fragmenting the gel into the form of finely-divided particles, the agarose gel may initially be produced in the form of spherical particles containing the occluded macro-molecular hydrocolloid. One procedure for producing the agarose gel in the form of spherical particles is a modification of the procedure described by Hjerten in "The Preparation of Agarose Spheres for Chromatography of Molecules and Particles," Biochim. Biophys. Acta, 79, 393–8 (1964). According to this procedure, the agarose is dissolved in water close to its boiling point to provide an aqueous solution of the desired agarose content, but before cooling the solution the agarose solution is suspended as the internal phase of a "water-in-oil" type emulsion wherein the external phase is an organic liquid that is not miscible with water such as a mixture of toluene and carbon tetrachloride, a hydrophobic stabilizer such as sorbitan sesquioleate and polyoxyethylene sorbitan monostearate being added to stabilize the suspension and the formation of the suspension being promoted by vigorous agitation. Upon cooling the solution the dispersed agarose solution becomes gelled in the form of nearly spherical beads which, depending on control factors such as the quantity and kind of stabilizer and intensity of agitation, may vary in size from spheres passing a 30 mesh standard testing screen to spheres passing a 300 mesh testing screen.

After the spheres have been formed, then in the practice of this invention, as distinguished from the procedure described in the aforesaid Hjerten paper, they are subjected to the desiccating action of a volatile hydrophilic liquid such as acetone which may be added directly to the suspension or, alternatively, after permitting the agarose spheres to settle and decanting the water-immiscible liquid. Upon successive contacts with the volatile hydrophilic liquid with intermediate filtration, the beads are produced in dehydrated condition and the volatile hydrophilic liquid is removed by air drying. Agarose gel beads produced as described above, after rehydration and removal of the occluded macro-hydrocolloid, exhibit useful gel filtration properties.

This invention may be practiced in ways other than when the dried argarose gel is produced in the form of finely-divided particles. Thus the agarose gel may be formed as a layer or film on a supporting surface, the layer or film as so produced having utility for such purposes as bacteriological assay, electrophoresis, and immuno-diffusion. The layer or film may be dried and rehydrated or it may be stripped from its supporting surface either after formation but prior to drying, or after drying but prior to rehydration. It is desirable in practical usage not to be required to prepare a film or layer of aqueous agarose gel freshly at the time of each usage but to be able to dry a film or layer of agarose gel for shipment and storage so that when an aqueous film or layer appropriate for a particular use is required all that need be done is to restore the dried gel film or layer to aqueous condition merely by rehydration. For such purposes the foregoing difficulties due to excessive loss of original gel structure are encountered when the concentration of the agarose in the agarose gel is of the order of 0.5% to 5% by weight, and such difficulties may be alleviated by the occlusion within the gel of a macro-molecular hydrocolloid as has been described hereinabove.

When the agarose gel is formed on a supporting surface this way of practicing the present invention lends itself best to the inclusion of the macro-molecular hydrocolloid in the gel as it becomes gelled on the supporting surface. The drying of the agarose gel containing the occluded macro-molecular hydrocolloid may be effected when disposed on the supporting surface or after it has been stripped therefrom by contact with a volatile hydrophilic liquid as has been described hereinabove. However, it has been found that simple air drying of the film or layer is not inconsistent with obtaining the beneficial effectiveness of the occluded macro-molecular hydrocolloid in preserving the ordered cell structure of the agarose gel when it is rehydrated. As before, the rehydration of the gel is accomplished by soaking it in water whereby the occluded macro-molecular hydrocolloid is removed by leaching, leaving the film or layer consisting essentially of aqueous agarose gel.

DETAILED DESCRIPTION

For testing the capacity of the dried gel to become rehydrated, a weight of the dried gel particles inversely proportional to the expected water content of the hydrated gel, in the range 50 to 125 mg., was weighed into a 30 cc. beaker and 15 cc. of distilled water at about 70° C. were added. The beaker was immersed in a 70° C. water bath and the contents stirred for 5 minutes. The rehydrated gel was collected by filtration through a Gooch crucible containing a disc of 200 mesh stainless steel screen. The thus collected sample was placed in a tared, covered aluminum dish and weighed. In calculating the water regain, a factor was introduced to account for moisture and hydrophilic colloid originally present and to express results in terms of agarose content only.

The aforesaid procedure for determining the agarose content of a rehydrated gel was employed for determining the capacity of an agarose gel to become rehydrated when the agarose gel was produced and dried in the absence of any occluded macro-molecular hydrocolloid when the agarose gels were prepared so as to contain substantially 1%, 2.5% and 5% agarose, respectively. The gels were fragmented, dried with acetone as the hydrophilic liquid, and rehydrated in the manner described hereinabove. The solids content of the respective gels were determined experimentally as freshly prepared and also after rehydration with the following results:

| Percent agarose before drying: | Percent agarose after drying and rehydration |
|---|---|
| 1.19 | 5.19 |
| 2.60 | 5.94 |
| 4.57 | 5.80 |

The foregoing comparisons between the agarous content of the aqueous gels prior to drying and after rehydration illustrate concretely the failure of the dried agarose gel to become rehydrated to an agarose content corresponding to that of the agarose gel prior to drying, the failure to so rehydrate becoming increasingly great as the agarose content of the original gel becomes less than 5%. The improved capacity to become rehydrated to an agarose content corresponding to that of the initially formed aqueous gel that is afforded by the presence of the macromolecular hydrocolloid is illustrated by the following examples.

EXAMPLE 1

2.5% agarose—Inclusion gel

Agarose gels containing 2.5% by weight of agarose were formed so as to have included therewith at the time of formation different macro-molecular hydrocolloids at different concentrations. The aqueous gel was reduced to finely particulate state, dried by contact with certain volatile hydrophilic liquids and rehydrated by soaking in water. The hydrocolloid was removed by leaching from the rehydrated agarose. The percent by weight of agarose contained in the rehydrated gel was determined for the purpose of ascertaining how closely the percent by weight of agarose compared with that in the original gel. The following is a more detailed description of the experimental work.

The macro-molecular hydrocolloid was dissolved in a measured quantity of water (1 or 2 liters) to provide a solution thereof. Sufficient agarose to provide an aqueous solution of 2.5% concentration was added and dissolved by heating the aqueous medium to a temperature between 90° C. and 100° C., the dissolution being promoted by agitation. When the solution containing the dissolved agarose was cooled to room temperature the hard gel typical of argarose was formed except that the macro-molecular hydrocolloid had become occluded within the cell structure of the agarose.

The formed gel was then fragmented by extrusion successively through a 20 mesh and an 80 mesh screen. The finely-divided gel particles were successively commingled with the volatile hydrophilic liquid used as a desiccant. One part by volume of the agarose gel particles was initially commingled with five parts by volume of the hydrophilic liquid. The drying was completed by separating the particles by filtration, commingling the separated particles with a second quantity of the hydrophilic liquid in the ratio of one part of agarose gel to four parts of hydrophilic liquid, again separating the particles from the liquid, and finally commingling the particles with another quantity of the hydrophilic liquid in the ratio of one part of the gel particles to three parts of the hydrophilic liquid. The hydrophilic liquid was then removed by filtration followed by air drying the particles for removing by evaporation the balance of volatile hydrophilic liquid. The dried gel particles were rehydrated in the manner above described for determining the capacity of the dried gel particles to become rehydrated. The results of these experimental tests are shown in the following table:

TABLE I
[2.5% agarose—Inclusion gel]

| Hydrocolloid solution | Solvent | No. of samples | Percent solids in gel rehydrated |
|---|---|---|---|
| 0.5% sodium alginate | Acetone | 4 | [1] 2.39 |
| Do | Methanol | 1 | 2.25 |
| Do | Isopropanol | 1 | 2.88 |
| 0.1% sodium alginate | Acetone | 1 | 2.62 |
| 0.5% potassium λ-carrageenate | do | 1 | 2.42 |
| 0.1% potassium λ-carrageenate | do | 1 | 2.43 |
| 0.5% amylopectin [2] | do | 3 | [1] 2.48 |
| 0.5% carrageenan [3] | do | 1 | 2.37 |
| 0.5% guar gum | do | 1 | 2.99 |
| 0.5% pectinic acid amide | do | 1 | 2.80 |
| 0.5% carbocymethyl locust bean gum | do | 1 | 2.05 |
| 0.5% okra mucilage | do | 1 | 2.58 |
| 0.5% gum tragacanth | do | 1 | 2.83 |
| 0.5% Phosphomannan Y2448 [4] | do | 1 | 2.27 |
| 0.5% Polysaccharide B1973 [5] | do | 1 | 2.10 |
| 0.5% Polysaccharide Y1401 [6] | do | 1 | 2.12 |
| 0.5% hydroxyethyl cellulose | do | 1 | 2.78 |
| 0.5% polyethylene oxide [7] | do | 2 | [1] 2.44 |
| 0.5% polyethylene oxide [8] | do | 1 | 2.64 |

[1] Average.
[2] Sold under trade name Ramalin "U" by Stein Hall & Co. Inc. (1956).
[3] Extract from *Chondrus crispus*.
[4] (Poly) D-mannose (phosphated). Distributed by U.S. Dept. of Agriculture, Northern Utilization Res. & Devel. Division.
[5] (Poly) D-glucose, D-galactose, D-mannuronic acid (acetylated). Distributed by U.S. Dept. of Agriculture, Northern Utilization Res. & Devel. Div.
[6] (Poly) D-mannose, D-xylose, D-glucuronic acid (acetylated). Distributed by U.S. Dept. of Agriculture, Northern Utilization Res. & Devel. Div.
[7] Sold under trade designation Polyox WSR 3000 by Union Carbide Corp.
[8] Sold under trade designation Polyox WSR 750 by Union Carbide Corp.

EXAMPLE 2

0.5% agarose—Inclusion gel

The test procedure of Example 1 was repeated except that in each case the concentration of the agarose in the agarose gel as initially produced was 0.5%. The experimental results are shown in the following table:

TABLE II
[0.5% agarose—Inclusion gel]

| Hydrocolloid solution | Solvent | No. of samples | Percent solids in gel rehydrated |
|---|---|---|---|
| 0.5% sodium alginate | Acetone | 1 | 0.60 |
| 0.5% potassium λ-carrageenate | do | 1 | 0.64 |
| 0.5% amylopectin [1] | do | 1 | 0.56 |

[1] As in Table I.

EXAMPLE 3

0.75% agarose—Inclusion gel

The test procedure of Example 1 was followed except that in each case the concentration of the agarose in the agarose gel as initially produced was 0.75%. The experimental results at this concentration of agarose are shown in the following table:

TABLE III
[0.75% agarose—Inclusion gel]

| Hydrocolloid solution | Solvent | No. of samples | Percent solids in gel rehydrated |
|---|---|---|---|
| 0.5% sodium alginate | Acetone | 1 | 0.90 |
| 0.5% potassium λ-carrageenate | do | 1 | 0.86 |
| 0.5% amylopectin [1] | do | 1 | 0.78 |
| 0.25% amylopectin [1] | do | 1 | 0.84 |

[1] As in Table I.

EXAMPLE 4

1% agarose—Inclusion gel

The test procedure of Example 1 was followed except that in each case the concentration of the agarose in the agarose gel as initially produced was 1.0%. The experimental results at this concentration of agarose are shown in the following table:

TABLE IV
[1% agarose—Inclusion gel]

| Hydrocolloid solution | Solvent | No. of samples | Percent solids in gel rehydrated |
|---|---|---|---|
| 0.5% sodium alginate | Acetone | 4 | [1] 1.12 |
| Do | Isopropanol | 1 | 1.19 |
| 0.5% amylopectin [2] | Acetone | 4 | [1] 1.25 |
| 0.5% potassium λ-carrageenate | do | 1 | 1.36 |
| 0.5% guar gum | do | 1 | 1.13 |

[1] Average.
[2] As in Table I.

EXAMPLE 5

5% agarose—Inclusion gel

The test procedure of Example 1 was followed except that in each case the concentration of agarose in the agarose gel was produced at the 5% agarose level with the actual agarose content as experimentally determined at 4.4%. The experimental results at this concentration of agarose are shown in the following table:

TABLE V
[5% agarose—Inclusion gel]

| Hydrocolloid solution | Solvent | No. of samples | Percent solids in gel rehydrated |
|---|---|---|---|
| 0.5% potassium λ-carrageenate | Acetone | 1 | 4.22 |
| 0.5% amylopectin [1] | do | 1 | 4.65 |

[1] As in Table I.

EXAMPLE 6

1% Agarose—Soaking preformed gel

The procedure of Example 1 was followed except that the agarose gel was initially formed and was fragmented by successive extrusions through a 20 mesh and 80 mesh screen in the absence of the added macro-molecular hydrocolloid. The aqueous gel particles were then commingled with the solution of the macro-molecular hydrocolloid by the addition of 200 ml. of the solution to 100 grams of the wet gel and the gel particles were permitted to soak overnight. Excess hydrocolloid solution was removed by filtration. The gel particles containing the imbibed solution of the hydrocolloid were then dried using a volatile hydrophilic liquid and thereafter were rehydrated as described above in connection with Example 1. The agarose content was experimentally determined for the agarose gel as initially formed prior to soaking and after rehydration and removal of the hydrocolloid by leaching. The experimental results are shown in the following table. Where a number of similar samples were prepared the range of the agarose is given, the lower values for the rehydrated gel corresponding, as a rule, with the lower values for the initial gel.

TABLE VI
[1% agarose—Soaking preformed gel]

| Hydrocolloid solution | Solvent | No. of samples | Percent agarose in gel | |
|---|---|---|---|---|
| | | | Original | Rehydrated |
| 0.5% sodium alginate | Acetone | 8 | 0.96–1.17 | .89–1.64 |
| 0.5% potassium λ-carrageenate | do | 2 | .96 | 1.29–2.34 |
| 0.5% amylopectin [1] | do | 8 | .96–1.19 | .89–1.64 |
| 0.5% deacetylated chitin [2] | do | 1 | .96 | 1.05 |

[1] As in Table I.
[2] (poly) D-glucosamine.

EXAMPLE 7

2.5% agarose—Soaking preformed gel

The procedure of Example 6 was followed except that in each case the concentration of the agarose gel as initially produced was approximately 2.5%. The experimental results at this concentration of agarose are shown in the following table:

TABLE VII
[2.5 agarose—Soaking preformed gel]

| Hydrocolloid solution | Solvent | No. of samples | Percent agraose in gel | |
|---|---|---|---|---|
| | | | Original | Rehydrated |
| 0.5% sodium alginate | Acetone | 10 | 2.30–2.68 | 2.22–2.90 |
| 0.1% soduim alginate | do | 2 | 2.30–2.60 | 2.16–2.66 |
| 0.5% potassium λ carrageenate | do | 1 | 2.60 | 2.66 |
| 0.1% potassium λ-carrageenate | do | 1 | 2.30 | 2.19 |
| 0.5% amylopectin [1] | do | 3 | 2.30–2.50 | 1.90–2.71 |
| 0.1% amylopectin [1] | do | 1 | 2.30 | 2.70 |
| 0.5% deacetylated chitin [2] | do | 1 | 2.30 | 2.50 |
| 0.5% polyvinyl pyrrolidone | do | 1 | 2.30 | 2.73 |

[1] As in Table I.
[2] As in Table VI.

EXAMPLE 8

4% agarose—Soaking preformed gel

The procedure of Example 6 was followed except that in each case the concentration of the agarose gel as initially produced was approximately 4%. The experimental results at this concentration of agarose are shown in the following table:

TABLE VIII
[4% agarose—Soaking preformed gel]

| Hydrocolloid solution | Solvent | No. of samples | Percent agarose in gel | |
|---|---|---|---|---|
| | | | Original | Rehydrated |
| 0.5% sodium alginate | Acetone | 1 | 3.74 | 3.93 |
| 0.5% amylopectin [1] | do | 1 | 3.74 | 3.36 |

[1] As in Table I.

EXAMPLE 9

5% agarose—Soaking preformed gel

The procedure of Example 6 was followed except that the concentration of the agarose gel as initially produced was approximately 5%. The experimental results at this concentration of agarose are shown in the following table:

TABLE IX
[5% agarose—Soaking preformed gel]

| Hydrocolloid solution | Solvent | No. of samples | Percent agarose in gel | |
|---|---|---|---|---|
| | | | Original | Rehydrated |
| 0.5% sodium alginate | Acetone | 2 | 5.43 | 4.89–5.20 |

EXAMPLE 10

1% agarose—Layer or film

A solution containing 1% agarose and 0.5% of sodium alginate as the macro-molecular hydrocolloid was prepared at elevated temperature at which the agarose remained soluble and the solution was spread on a plate and permitted to cool until the agarose gelled with the dissolved hydrocolloid occluded within the cell structure of an aqueous agarose gel. The aqueous gel layer was dehydrated by successively contacting it with three applications of acetone, air dried, and thereafter the dried layer was rehydrated. The agarose content of the rehydrated gel layer was calculated based on micrometer measurements of layer thickness and on layer weight, before and after rehydration. The dried layer was .0010" thick in the dry condition and was .0938" thick after rehydration. Based on these measurements, the calculated percent of agarose in the rehydrated gel was 1.06%. A portion of the dried layer was determined to weigh .1195 gram. After rehydration the weight of the dried sample had increased to 8.0827 grams. The calculated percent of agarose based on these measurements was 0.99%. It is apparent the agarose content of the rehydrated gel layer corresponded very closely with the agarose content of the initially formed layer. The thickness and weight of the dry film were measured when the hydrocolloid was occluded therewithin. It is to be understood, however, that the hydrocolloid is removable by leaching prior to utilization of the agarose layer for such purposes as bacteriological assay, electrophoresis or immuno-diffusion. When the hydrocolloid is removed by leaching the residual gel is adapted for gel filtration or other molecular sorting. On the other hand, if appropriate substances (or substance) are present such as nutrients, salts and the like in addition to the macro-molecular hydrocolloid, the rehydration may be accomplished with approximately the correct amount of water required to rehydrate the gel to the predetermined percent solids content, leaving the rehydrated hydrocolloid within the agarose gel together with the added substances (or substance) which may, for example, be selected for utilization of the rehydrated gel in making a bacteriological assay. While the layer or film may be dried and rehydrated while disposed on a supporting surface, the layer or film may be stripped from the supporting surface while still wet prior to drying. It also is the case that the dried layer or film lends itself to being stripped from the supporting surface after drying and prior to rehydrating. Thus the dried layer or film may be produced and sold either in combination with a supporting surface such as that of a plate or as a separate entity.

We claim:
1. A method of producing a dried agarose gel which comprises forming an aqueous gel consisting essentially of agarose at a concentration of about 0.5% to about 5% by weight, including in the cell structure of the aqueous gel so as to be occluded therewithin at a concentration of about 0.1% to about 1.0% by weight an aqueous solution of a macro-molecular predominantly organic hydrocolloid having a molecular weight of at least about 5,000 that is soluble in water to the extent of at least a 1% solution at a temperature below that at which the agarose of said gel possesses finite solubility and drying the aqueous gel while said aqueous solution at substantially said concentration remains occluded therein, thereby improving the capacity of the dried gel to become rehydrated to form an aqueous gel wherein the percent by weight of agarose corresponds with that of the original gel.

2. A method according to claim 1 wherein the agarose gel prior to drying is caused to occur in the form of a multiplicity of particles and the drying of the aqueous gel particles is accomplished by commingling the particles with a volatile hydrophilic liquid with concomitant dehydration of the agarose gel and coagulation in situ of the macro-molecular hydrocolloid, the volatile hydrophilic liquid thereafter being removed leaving the dried agarose gel containing the occluded coagulated macro-molecular hydrocolloid.

3. A method according to claim 2 wherein said hydrophilic drying liquid consists essentially of acetone.

4. A method according to claim 2 wherein the agarose gel initially is formed en masse and the agarose gel is broken up to form the multiplicity of finely-divided particles by extrusion through a screen.

5. A method according to claim 4 wherein the screen is a standard screen between about 60 and about 150 mesh.

6. A method according to claim 2 wherein the agarose gel is produced in the form of a multiplicity of beads in a water immiscible dispersing liquid.

7. A method according to claim 2 wherein the occluded macro-molecular hydrocolloid preserves the capacity of the dried gel to become rehydrated to form an aqueous gel wherein the percent by weight of agarose differs from that of the original gel by not more than 20% of the percent by weight of the agarose in the original gel.

8. A method according to claim 7 wherein the aqueous gel is formed by cooling an aqueous solution of agarose that also contains the macro-molecular hydrocolloid therein at a concentration of about 0.1% to about 1.0% by weight whereby the agarose gel upon its formation has the macro-molecular hydrocolloid occluded therein.

9. A method according to claim 7 wherein the aqueous agarose gel is produced and is caused to occur in the form of a multiplicity of finely-divided particles and the finely-divided particles are soaked in an aqueous solution of the macro-molecular hydrocolloid at a temperature at which the agarose is insoluble to cause said solution containing said hydrocolloid to penetrate the agarose particles with resultant occlusion prior to drying of the hydrocolloid within the cell structure of the agarose particles.

10. A method according to claim 1 wherein the aqueous agarose gel containing the occluded macro-molecular hydrocolloid is formed as a continuous layer while disposed on a supporting surface and the layer is dried in situ.

11. A method of producing an aqueous agarose gel which comprises forming an aqueous gel consisting essentially of agarose at a concentration of about 0.5% to about 5% by weight; including in the cell structure of the aqueous gel so as to be occluded therewith at a concentration of about 0.1% to about 1% by weight an aqueous solution of a macro-molecular predominantly organic hydrocolloid having a molecular weight of at least about 5,000 that is soluble in water to the extent of at least a 1% solution at a temperature below that at which the agarose of said gel possesses finite solubility; causing the agarose gel to occur in the form of a multiplicity of particles; drying the aqueous gel while said aqueous solution at substantially said concentration remains occluded therein, thereby improving the capacity of the dried gel to become rehydrated to form an aqueous gel wherein the percent by weight of agarose corresponds with that of the original gel by commingling the particles with a volatile hydrophilic liquid with concomitant dehydration of the agarose gel and coagulation in situ of the macro-molecular hydrocolloid; removing the volatile hydrophilic liquid to leave a dried agarose gel containing the occluded coagulated macro-molecular hydrocolloid; rehydrating the dried agarose gel to form an aqueous agarose gel; and removing the macro-molecular hydrocolloid from the gel by leaching.

12. A rehydratable dried gel composition which consists essentially of a dried gel matrix that consists essentially of agarose whose cell structure is that determined by formation from an aqueous solution containing from about 0.5% to about 5% of said agarose and that contains occluded dried in situ therewithin a macro-molecular predominantly organic hydrocolloid having a molecular weight of at least about 5,000 that is water soluble to the extent of at least a 1% solution at a temperature below that at which said agarose has finite solubility whereby said hydrocolloid upon rehydration of said gel is removable by aqueous leaching to provide a rehydrated aqueous gel consisting essentially of agarose.

13. A rehydratable dried gel according to claim 12 wherein the dried gel is rehydratable to form an aqueous gel wherein the percent by weight of agarose is within 20% of the percent by weight of agarose in the gel prior to drying.

14. A rehydratable dried gel according to claim 13 wherein said dried gel is in finely particulate form.

15. A rehydratable gel according to claim 13 wherein said dried gel is in the form of a layer or film.

16. A rehydratable gel according to claim 13 wherein said macro-molecular hydrocolloid has a molecular weight of from about 5000 to about $1 \times 10^6$.

References Cited

UNITED STATES PATENTS

| | | | |
|---|---|---|---|
| 3,281,409 | 10/1966 | Blethen | 260—209 |
| 3,423,396 | 1/1969 | Zabin | 260—209 |

RICHARD D. LOVERING, Primary Examiner

U.S. Cl. X.R.

106—208; 195—100; 204—180; 210—31; 252—408; 260—209

PO-1050
(5/69)

UNITED STATES PATENT OFFICE
CERTIFICATE OF CORRECTION

Patent No. 3,527,712   Dated Sept. 8, 1970

Inventor(s) Donald W. Renn and George P. Mueller

It is certified that error appears in the above-identified patent and that said Letters Patent are hereby corrected as shown below:

Col. 2, 6th line from bottom, "0.05%" should be --0.5%--.

Col. 5, line 32, "port" should be --pore--;

line 47, insert --about-- after the word "above".

Col. 11, in Table IV, second listing under "Rehydrated", "1.29 - 2.34" should be --1.29 - 1.34--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents